(No Model.)

E. C. IBBOTSON.
SCREW NUT.

No. 323,422. Patented Aug. 4, 1885.

Witnesses
R. E. Grant
W. B. Stevens

Inventor
Edward C. Ibbotson
per W. H. Singleton,
Atty.

UNITED STATES PATENT OFFICE.

EDWARD CHARLES IBBOTSON, OF BOSTON, MASSACHUSETTS.

SCREW-NUT

SPECIFICATION forming part of Letters Patent No. 323,422, dated August 4, 1885.

Application filed June 23, 1884. (No model.)

*To all whom it may concern:*

Be it known that I, EDWARD CHARLES IBBOTSON, a subject of the Queen of Great Britain and Ireland, and a resident of Boston, (Chelsea,) of the county of Suffolk, of the Commonwealth of Massachusetts, have invented a new and useful Improvement in Screw-Nuts; and I do hereby declare the same to be described in the following specification, and represented in the accompanying drawings, of which—

Figure 1:
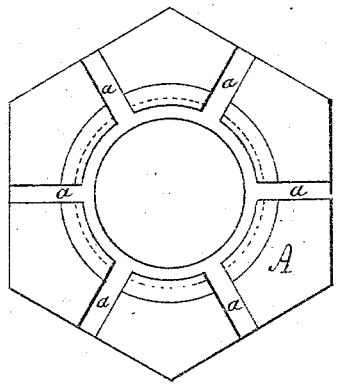
Figure 2:
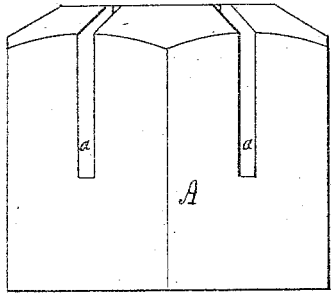
Figure 3:
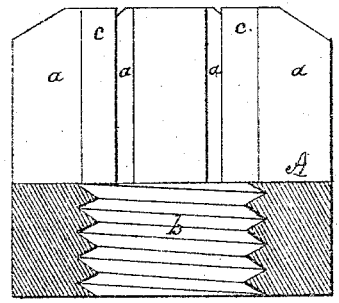

Figure 1 is an end view; Fig. 2, a side elevation, and Fig. 3 a transverse section of a screw-nut of my invention, the nature of which is defined in the claim hereinafter presented.

Such invention is for the purpose of preventing the nut from accidentally turning back or unscrewing from a screw or bolt when in engagement therewith; and such invention consists in a screw-nut cross cut at one end, so as to be expansible radially, and having part of its bore at such end cylindrical and without any screw-thread, or less in diameter than that of the spiral or screw-thread-receiving groove extending throughout the rest of such bore, such being so that on the nut being screwed upon a screw or screw-bolt the thread of the said screw or screw-bolt on being forced into the diminished or smaller part of the bore of the nut shall, by acting against it, expand the nut, and thereby cause it by its inherent elasticity to bind firmly to the screw or screw-bolt.

In the said drawings, A denotes a screw-nut, prismatic in shape, and provided with a series of cross-cuts, $a$, formed in it from one end toward but not extending to its other end. As represented, each of the cross-cuts goes through the nut transversely and through its axis, the said cross-cuts enabling the parts of the nut that are directly between them to be sprung outwardly in directions radial to the axis of the nut. The nut having been bored for being tapped is next to have the bore at and near its end in which the cross-cuts are made cut cylindrically to a diameter a little less than that of the spiral or screw groove of the nut. This groove is shown at $b$ in Fig. 3, and extends from one end of the nut to a short distance from the opposite or cross-cut end thereof, from which it will be seen that, as represented, the portion $c$ of the bore next the cross-cut end of such bore is without any spiral groove to engage with the spiral thread of a screw-bolt, when the nut may be screwed thereupon. On the screw of the bolt attaining that terminus of the groove which is next the cross-cut end of the nut, such screw, as the nut may be advanced upon it, will be forced into the part $c$ or diminished portion of the bore of the nut, and in so doing will expand the nut or cause it to give way, and so firmly grasp the screw as to be prevented from accidentally unscrewing.

I am aware that a nut has been made having a part of its bore smaller than the other, and has been provided with slits at such smaller portion, but such portion has been threaded. By making such portion plain or unthreaded the bolt is bound without jamming the threads thereof.

What I claim is—

The nut A, having the threaded groove $b$, the unthreaded portion $c$ of a less diameter then the groove $b$, and the slits $a$, the last extending only the length of the portion $c$, as set forth.

EDWARD CHARLES IBBOTSON.

Witnesses:
R. H. EDDY,
E. B. PRATT.